US011472383B2

(12) United States Patent
Sakaguchi et al.

(10) Patent No.: US 11,472,383 B2
(45) Date of Patent: Oct. 18, 2022

(54) VEHICLE BRAKING FORCE CONTROL DEVICE

(71) Applicant: Hitachi Automotive Systems, Ltd., Hitachinaka (JP)

(72) Inventors: Tomoyasu Sakaguchi, Hitachinaka (JP); Yoshiyuki Yoshida, Hitachinaka (JP); Masashi Seimiya, Hitachinaka (JP); Takashi Matsuoka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 305 days.

(21) Appl. No.: 16/317,002

(22) PCT Filed: Jul. 26, 2017

(86) PCT No.: PCT/JP2017/026980
§ 371 (c)(1),
(2) Date: Jan. 10, 2019

(87) PCT Pub. No.: WO2018/047496
PCT Pub. Date: Mar. 15, 2018

(65) Prior Publication Data
US 2019/0241163 A1 Aug. 8, 2019

(30) Foreign Application Priority Data
Sep. 6, 2016 (JP) .............................. JP2016-173532

(51) Int. Cl.
*B60W 10/18* (2012.01)
*B60T 8/00* (2006.01)
(Continued)

(52) U.S. Cl.
CPC ................ *B60T 8/174* (2013.01); *B60T 7/22* (2013.01); *B60T 8/00* (2013.01); *B60T 8/321* (2013.01);
(Continued)

(58) Field of Classification Search
None
See application file for complete search history.

(56) References Cited

U.S. PATENT DOCUMENTS

2004/0016594 A1\* 1/2004 Yasui ...................... B62D 6/04
180/446
2008/0183353 A1\* 7/2008 Post .................... B60W 10/184
701/84

(Continued)

FOREIGN PATENT DOCUMENTS

JP          07-257336 A      10/1995
JP          2008-094117       4/2008
(Continued)

OTHER PUBLICATIONS

International Search Report (along with its English Language Translation) and Written Opinion (Japanese Language only) issued in PCT/JP2017/026980 dated Nov. 7, 2017.

*Primary Examiner* — Maceeh Anwari
*Assistant Examiner* — Charles Pall
(74) *Attorney, Agent, or Firm* — Foley & Lardner LLP

(57) ABSTRACT

The present invention prevents occurrence of abnormal noise and swing of a vehicle in mitigating braking force of a steered wheel while reducing a steering load at the time of stationary steering to reduce a burden of a steering device and reducing stress accumulation due to stationary steering to reduce burdens of a tire, a suspension device and the steering device. The present invention includes a stop braking force control unit 202 that individually controls braking forces of steered wheels 51 and 52 and non-steered wheels (Continued)

53 and 54 at the time of deceleration of the vehicle, and a pre-detection unit 203 that detects steering in a stopped state of the vehicle in advance, in which the stop braking force control unit executes, when the steering in a stopped state of the vehicle is detected in advance by the pre-detection unit, braking force mitigation control to decrease the braking forces of the steered wheels to be lower than the braking forces at the time of normal braking.

19 Claims, 10 Drawing Sheets

(51) Int. Cl.
| | | |
|---|---|---|
| B60T 7/22 | (2006.01) | |
| B60T 8/32 | (2006.01) | |
| B60W 30/18 | (2012.01) | |
| B60T 8/174 | (2006.01) | |
| B60W 10/20 | (2006.01) | |
| B62D 6/00 | (2006.01) | |
| B60W 30/06 | (2006.01) | |
| B62D 15/02 | (2006.01) | |

(52) U.S. Cl.
CPC ............ *B60W 10/18* (2013.01); *B60W 10/20* (2013.01); *B62D 6/00* (2013.01); *B60T 2250/04* (2013.01); *B60T 2270/10* (2013.01); *B60T 2270/30* (2013.01); *B60W 30/06* (2013.01); *B60W 30/18054* (2013.01); *B60W 2510/109* (2013.01); *B60W 2510/20* (2013.01); *B60W 2520/12* (2013.01); *B60W 2520/26* (2013.01); *B60W 2530/00* (2013.01); *B60W 2710/18* (2013.01); *B60W 2710/20* (2013.01); *B62D 6/001* (2013.01); *B62D 15/025* (2013.01); *B62D 15/0285* (2013.01)

(56) References Cited

U.S. PATENT DOCUMENTS

| | | | |
|---|---|---|---|
| 2010/0113214 A1* | 5/2010 | Krueger | B60W 20/10 180/65.265 |
| 2012/0283923 A1* | 11/2012 | Yamada | B60T 8/243 701/70 |
| 2014/0032094 A1* | 1/2014 | Heinrichs-Bartscher | B60W 50/0097 701/301 |
| 2014/0239861 A1 | 8/2014 | Ajima et al. | |
| 2015/0127226 A1* | 5/2015 | Takeuchi | B60T 13/686 701/70 |
| 2016/0240080 A1* | 8/2016 | Nordbruch | G08G 1/147 |
| 2016/0347181 A1* | 12/2016 | Yamakado | B60L 15/2009 |
| 2017/0010618 A1* | 1/2017 | Shashua | G06V 20/582 |
| 2018/0023493 A1* | 1/2018 | Khafagy | F02D 41/065 477/98 |

FOREIGN PATENT DOCUMENTS

| | | | | |
|---|---|---|---|---|
| JP | 2008094117 | * | 4/2008 | ............. B60T 7/12 |
| JP | 2008094117 A | * | 4/2008 | |
| JP | 2014-015082 A | | 1/2014 | |
| JP | 2014015082 | * | 1/2014 | ............. B60T 8/00 |
| JP | 2014015082 A | * | 1/2014 | |
| JP | 2014-168332 A | | 9/2014 | |

* cited by examiner

PREDETERMINED ANGLE RANGE IN WHICH BRAKING FORCE MITIGATION IS PROHIBITED

INCLINATION OF ROAD SURFACE IS DETECTED BY G SENSOR OR CHANGE IN TRAVELING RESISTANCE IS DETECTED

SLIP OCCURS AND ABS OR ESC IS ACTIVATED, OR SLIP OCCURS AND WHEEL SPEED DIFFERENCE OCCURS

VEHICLE ALMOST HITS LEADING VEHICLE AND STRONG BRAKE IS APPLIED, OR AUTOMATIC BRAKING IS ACTIVATED FOR COLLISION PREVENTION

VEHICLE BRAKING FORCE CONTROL DEVICE

TECHNICAL FIELD

The present invention relates to a braking force control device that individually controls braking forces of steered wheels and non-steered wheels at the time of deceleration of a vehicle.

BACKGROUND ART

A driving operation to steer a stopped vehicle is called stationary steering and is a driving operation that enables turning with a minimum turning radius of the vehicle. Further, the turning radius during turning can be made constant by a stationary steering operation. The stationary steering operation has been conventionally carried out by many drivers because the stationary steering operation is sometimes necessary at the time of turning a vehicle in a narrow space and a traveling path of the vehicle can be simplified. Further, similarly in an autopilot system, the stationary steering operation is still an important driving operation for the necessity in a narrow space and the simplification of an operation algorithm.

While in steering in the stopped state, the steered wheel rotates about a kingpin axis by an steering angle, a total drag amount of a tire of the steered wheel becomes larger when the tire is rotated about the kingpin axis than when the tire is rotated about a contact surface center of the tire, in a case where a distance between the kingpin axis and the contact surface center of the tire, a so-called scrub radius exists. The scrub radius is determined by a positional relationship between the kingpin axis and the wheel. Since, generally, a steering force at the time of steering can be smaller and a force of a steering device received from the ground can be made smaller as the scrub radius is smaller, the kingpin axis is often designed to be as close to a wheel center as possible. However, the scrub radius cannot be often designed to be small due to various restrictions of a suspension device, the steering device, a driving force transmission device, and the like.

While the total drag amount of the tire at the time of stationary steering is larger as the scrub radius is large, here, the tire is not always dragged at the time of stationary steering, and a stress against the steering force is accumulated as distortion of each part of the vehicle, such as the tire, a brake device, the suspension device, or the steering device within a range not exceeding a frictional force between the tire and the ground. These distortions are released when the vehicle starts traveling. However, even in the stopped state, the distortion in a circumferential direction of the scrub radius can be released by loosening braking by the brake device to enable rotation of the steered wheel. For example, PTL 1 to PTL 3 disclose methods of loosening braking of a steered wheel at the time of stationary steering.

PTL 1 discloses a method of loosening a braking force of a steered wheel in a case of detecting a steering operation in a stopped state of a vehicle.

PTL 2 discloses a method of detecting intention of an occupant or start of movement of a vehicle and recovering a braking force after loosening the braking force of a steered wheel, similarly to PTL 1.

PTL 3 discloses a method of not performing control to loosen a braking force of a steered wheel similar to PTL 1 or PTL 2 when detecting a road surface gradient.

CITATION LIST

Patent Literature

PTL 1: JP 07-257336 A
PTL 2: JP 2008-094117 A
PTL 3: JP 2014-015082 A

SUMMARY OF INVENTION

Technical Problem

However, in any of PTL 1 to PTL 3, control to mitigate the braking force is performed after the stationary steering operation is detected. In the case where the braking force mitigation control is started after detection of the stationary steering in this way, the braking force mitigation control does not work in a steering amount during a control delay time due to a delay up to control start of a detection margin and a delay of a required time of the braking force mitigation control after the control start. In particular, in a case where steering speed is high, the steering amount during the control delay time becomes large. Further, in such a situation where the steering amount has already occurred, performing the braking force mitigation control becomes a cause of abnormal noise and swing of the vehicle due to release of already accumulated stress. Meanwhile, the detection margin is necessary to prevent erroneous detection of control, and a performance limit of the device exists in the required time of the braking force mitigation control.

The present invention has been made in view of the above problem, and an object of the present invention is to provide a braking force control device capable of preventing occurrence of abnormal noise and swing of a vehicle in mitigating a braking force of a steered wheel while reducing a steering load at the time of stationary steering to reduce a burden of a steering device and suppressing stress accumulation due to stationary steering to reduce burdens of the tire, a suspension device and the steering device.

Solution to Problem

To achieve the above object, the present invention includes a stop braking force control unit that individually controls braking forces of a steered wheel and a non-steered wheel at the time of deceleration of a vehicle, and a pre-detection unit that detects steering in a stopped state of the vehicle in advance, in which the stop braking force control unit executes, when the steering in a stopped state of the vehicle is detected in advance by the pre-detection unit, braking force mitigation control to decrease the braking force of the steered wheel to be lower than the braking force at the time of normal braking.

In the present invention configured as described above, the steering (stationary steering) in the stopped state of the vehicle is detected in advance, and the braking force mitigation control to decrease the braking forces of the steered wheels to be lower than the braking forces at the time of normal braking is executed before the stationary steering is started, whereby the steering load at the time of stationary steering is reduced and the burden of the steering device is reduced, and the stress accumulation due to the stationary steering is suppressed, and thus the burdens of the tire, the suspension device and the steering device can be reduced. In addition, the abnormal noise and swing of the vehicle can be prevented in mitigating the braking forces of the steered wheels by suppressing the stress accumulation in the tire, the suspension device, and the steering device.

Advantageous Effects of Invention

According to the present invention, occurrence of abnormal noise and swing of a vehicle can be prevented in mitigating braking forces of steered wheels while a steering load at the time of stationary steering is reduced and a load of a steering device is reduced, and stress accumulation due to stationary steering is reduced, and thus loads of the tire, a suspension device and the steering device are reduced.

DESCRIPTION OF EMBODIMENTS

Figure 1:
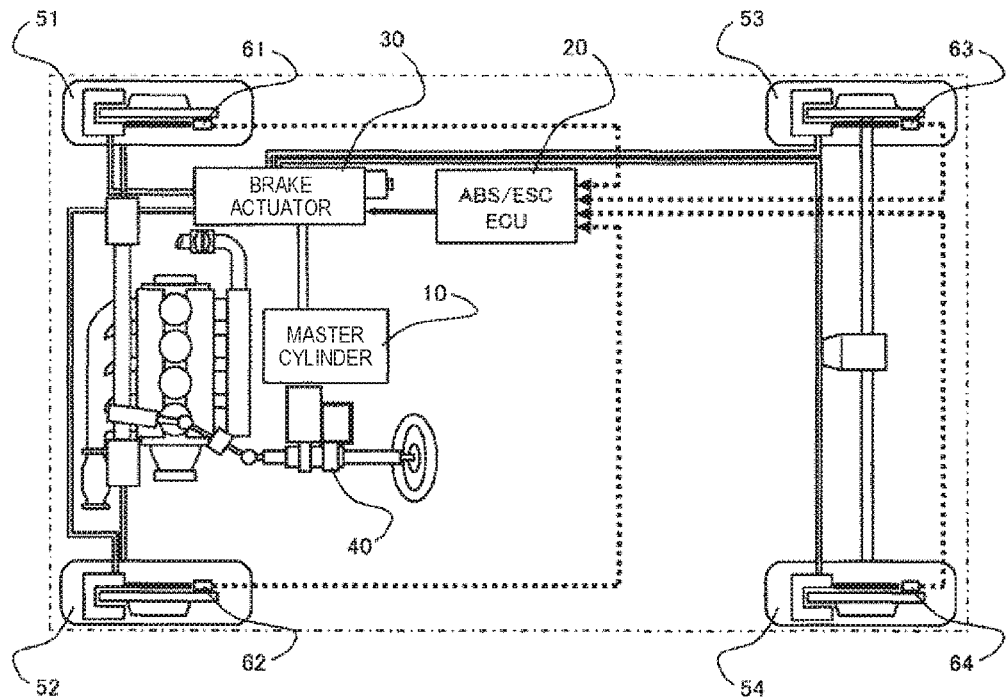
FIG. 1 is an overall configuration diagram illustrating an example of a braking force control system including a braking force control device according to a first embodiment of the present invention.

Embodiments of the present invention will be described below with reference to the drawings. Note that, in the drawings, the same reference numeral is given to members or elements having the same action or function, and redundant explanation will be appropriately omitted.

First Embodiment

In the present embodiment, a case in which an occupant operates a vehicle on the basis of his/her own intention, and a case in which the occupant operates the vehicle while receiving some assistance from the vehicle side are assumed. A braking force control device according to the present embodiment executes control to decrease braking forces of steered wheels to be lower than the braking forces at the time of normal braking (hereinafter appropriately referred to as "braking force mitigation control") in a case of detecting stationary steering in advance on the basis of a state of the vehicle and determining that there is no problem if such control is executed.

FIG. 1 is an overall configuration diagram illustrating an example of a braking force control system including a braking force control device according to a first embodiment of the present invention. In FIG. 1, a braking force control system includes a master cylinder 10, an ABS/ESC electronic control unit (ECU) 20 as a braking force control device that individually controls braking forces of steered wheels 51 and 52 and non-steered wheels 53 and 54 at the time of deceleration of the vehicle, a brake actuator 30, a steering assist device 40, and wheel speed sensors 61 to 64, as main constituent elements. The master cylinder 10 can generate a master cylinder pressure as an occupant operates a brake pedal (not illustrated). The braking force control device 20 controls the brake actuator 30 to adjust a brake pressure (braking pressure) of each of the wheels 51 to 54 of the vehicle on the basis of the master cylinder pressure, thereby to individually adjust the braking force of each of the wheels 51 to 54. Note that the brake actuator 30 can increase or decrease the brake pressure of each of the wheels 51 to 54 even when the master cylinder pressure is not generated. The wheel speed sensors 61 to 64 can generate signal waveforms according to rotational speeds of the wheels 51 to 54. The braking force control device 20 can measure a vehicle speed of the vehicle on the basis of the signal waveforms generated by the wheel speed sensors 61 to 64. The steering assist device 40 can assist the steering force by the occupant's steering attention.

Figure 2:
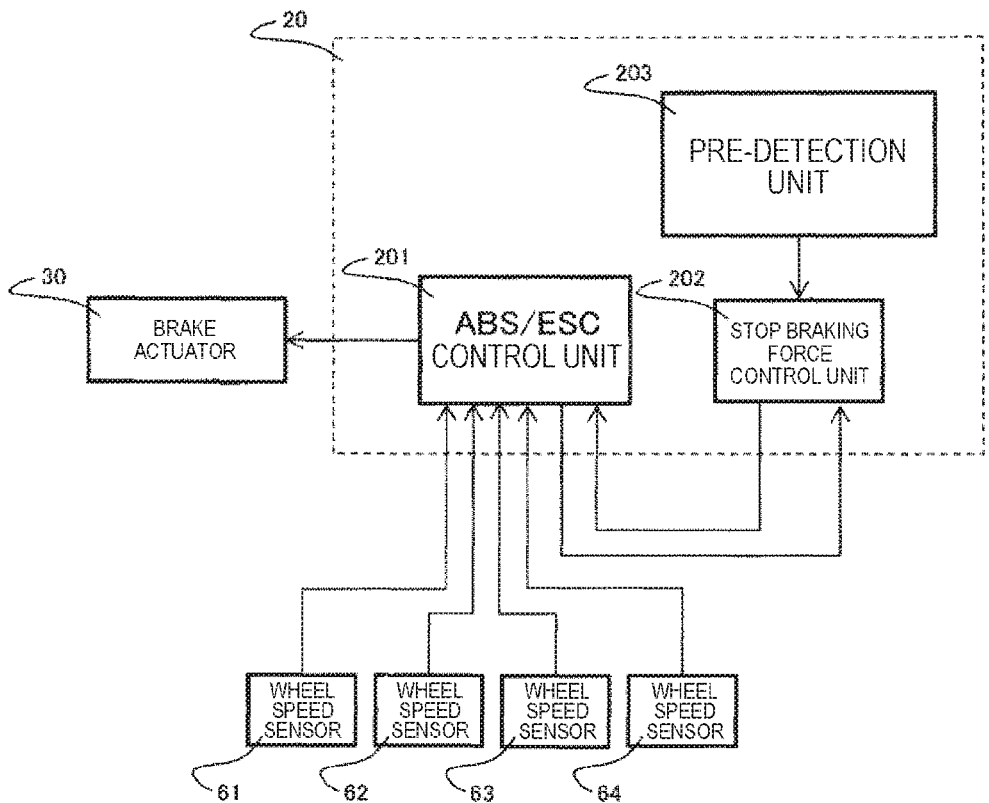
FIG. 2 is a control block diagram illustrating a control configuration of the braking force control device according to the first embodiment of the present invention.

FIG. 2 is a control block diagram illustrating a control configuration of the braking force control device 20. In FIG. 2, the braking force control device 20 includes an ABS/ESC control unit 201, a stop braking force control unit 202, and a pre-detection unit 203 as basic constituent elements, and controls the brake actuator 30 on the basis of signals input from the wheel speed sensors 61 to 64, and the like.

The ABS/ESC control unit 201 is a control block mounted in the braking force control device 20 and controls the brake actuator 30. Further, the ABS/ESC control unit 201 receives the signals from the wheel speed sensors 61 to 64 and generates a vehicle speed signal.

The pre-detection unit 203 inputs information of each part of the vehicle according to a pre-detection method, and controls the stop braking force control unit 202 on the basis of a detection result. The pre-detection unit 203 may be mounted in the braking force control device 20 or may be mounted on another controller device.

The stop braking force control unit 202 controls the ABS/ESC control unit 201 on the basis of the signal from the pre-detection unit 203 and the vehicle speed signal from the ABS/ESC control unit 201. The stop braking force control unit 202 may be mounted in the braking force control device 20 or may be mounted on another controller device. The input from the stop braking force control unit 202 to the ABS/ESC control unit 201 is, for example, a signal specifying an upper limit value of the braking pressure of each of the wheels 51 to 54. The braking forces of the steered wheels 51 and 52 can be mitigated by specifying a low value as the upper limit value of the brake pressures of the steered wheels 51 and 52. Further, this input is, for example, a signal specifying an increase/decrease pressure value of the brake pressure of each of the wheels 51 to 54. The braking force of the entire vehicle can be maintained by specifying a decrease in pressure in the steered wheels 51 and 52 and specifying an increase in pressure in the non-steered wheels 53 and 54. This is effective in a case where the braking force of the steered wheels 51 and 52 are mitigated on a gradient road, for example.

Figure 3:
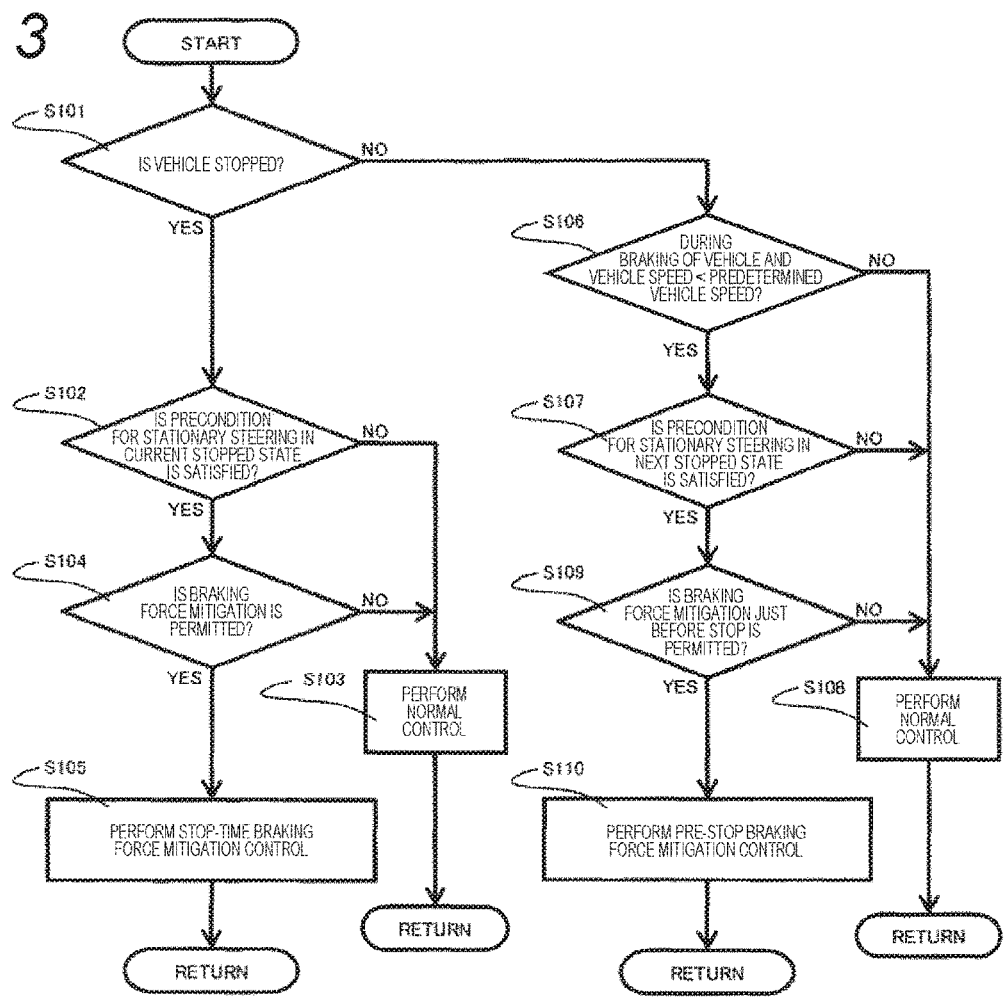
FIG. 3 is a flowchart illustrating braking force mitigation control in the first embodiment of the present invention.

FIG. 3 is a flowchart illustrating braking force mitigation control in the present embodiment. The control illustrated in the present flowchart is always executed by the stop braking force control unit 202. Hereinafter, steps constituting the present flowchart will be described in order.

First, whether the vehicle is stopped is determined on the basis of a vehicle speed signal measured by the wheel speed sensors 61 to 64 (step S101).

In a case where it is determined that the vehicle is stopped (YES) in step S101, whether the stationary steering in a current stopped state is detected in advance by the pre-detection unit 203 is determined (step S102). Here, the pre-detection unit 203 detects the stationary steering in advance when the state of the vehicle satisfies a prescribed precondition. Note that a plurality of prescribed preconditions may be adopted and the preconditions may be combined under AND condition or OR condition.

In a case where it is determined that the stationary steering in the current stopped state is not detected in advance (NO) in step S102, normal control is executed (step S103) and the processing returns to step S101. Here, the normal control is control to adjust the brake pressure of each of the wheels 51 to 54 according to an operation of the brake pedal by the occupant.

In a case where it is determined that the stationary steering in the current stopped state is detected in advance in step S102, whether braking force mitigation of the steered wheels 51 and 52 is permitted is determined (step S104). Whether the braking force mitigation of the steered wheels 51 and 52 is permitted is determined on the basis of whether the state of the vehicle does not satisfy a prescribed prohibition condition. Note that a plurality of prescribed prohibition conditions may be adopted and the prohibition conditions may be combined under AND condition or OR condition.

In a case where it is determined that the braking force mitigation of the steered wheels 51 and 52 is not permitted (NO) in step S104, the normal control is executed (step S103) and the processing returns to step S101. On the other hand, in a case where it is determined that the braking force mitigation of the steered wheels 51 and 52 is permitted (YES), stop-time braking force mitigation control is executed (step S105) and the processing returns to step S101.

In a case where it is determined that the vehicle is not stopped (NO) in step S101, whether it is during braking of the vehicle and the vehicle speed falls below a predetermined vehicle speed is determined (step S106). In a case where it is determined that it is not during braking of the vehicle or the vehicle speed is equal to or larger than the predetermined vehicle speed (NO) in step S106, the normal control is executed (step S108) and the processing returns to step S101. On the other hand, in a case where it is determined that it is during braking of the vehicle and the vehicle speed falls below the predetermined vehicle speed (YES), whether the stationary steering in a next stopped state is detected in advance by the pre-detection unit 203 is determined (step S107). Here, the pre-detection unit 203 detects the stationary steering in the next stopped state in advance when the state of the vehicle satisfies a prescribed precondition. Note that a plurality of prescribed preconditions may be adopted and the preconditions may be combined under AND condition or OR condition.

In a case where it is determined that the stationary steering in the next stopped state is not detected in advance (NO) in step S107, the normal control is executed (step S108) and the processing returns to step S101. On the other hand, in a case where it is determined that the stationary steering in the next stopped state is detected in advance (YES), whether the braking force mitigation of the steered wheels 51 and 52 just before stop is permitted is determined (step S109). Here, whether the braking force mitigation of the steered wheels 51 and 52 just before stop is permitted is determined on the basis of whether a prescribed prohibition condition is satisfied. Note that a plurality of prescribed prohibition conditions may be adopted and the prohibition conditions may be combined under AND condition or OR condition.

In a case where it is determined that the braking force mitigation of the steered wheels 51 and 52 just before stop is not permitted (NO) in step S109, the normal control is executed (step S108) and the processing returns to step S101. On the other hand, in a case where it is determined that the braking force mitigation of the steered wheels 51 and 52 just before stop is permitted (YES), pre-stop braking force mitigation control is executed (step S110) and the processing returns to step S101.

Figure 4:
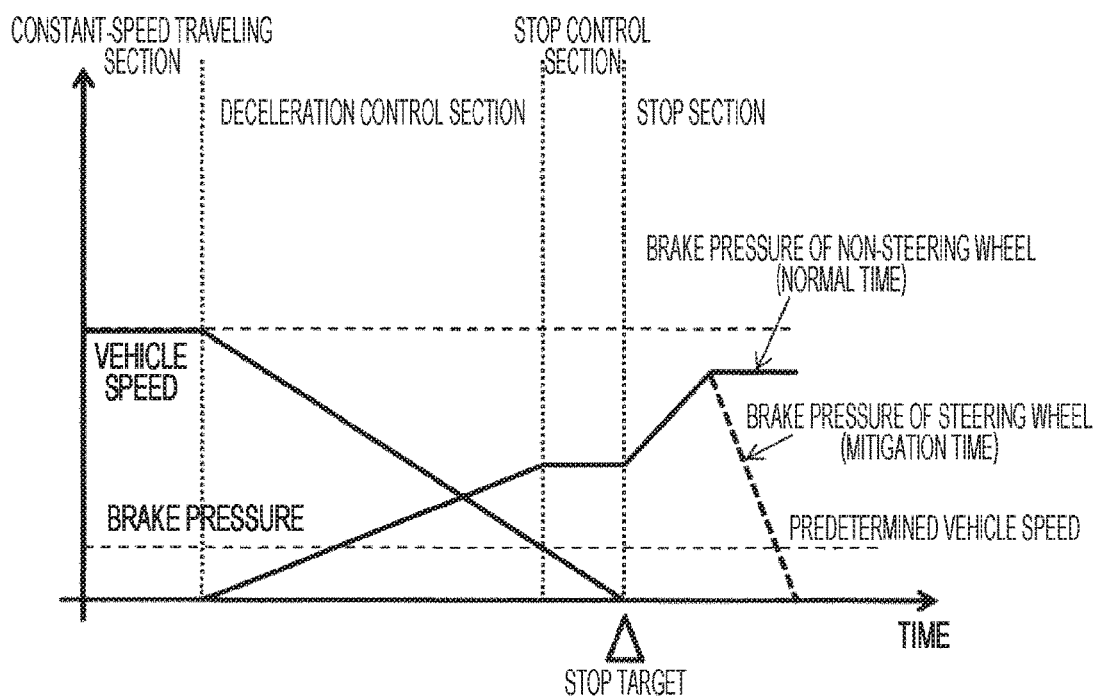
FIG. 4 is a time chart illustrating an example of change in vehicle speed and brake pressure in a case where stop-time braking force mitigation control in the first embodiment of the present invention is executed.

FIG. 4 is a time chart illustrating an example of change in vehicle speed and brake pressure in a case where stop-time braking force mitigation control (step S105 in FIG. 3) is executed. In the example illustrated in FIG. 4, the stationary steering is detected in advance before stop or after stop of the vehicle, the brake pressures of the steered wheels 51 and 52 are decreased to be lower than the brake pressures at the time of normal braking after stop of the vehicle, and a steering load at the time of stationary steering is reduced.

Figure 5:
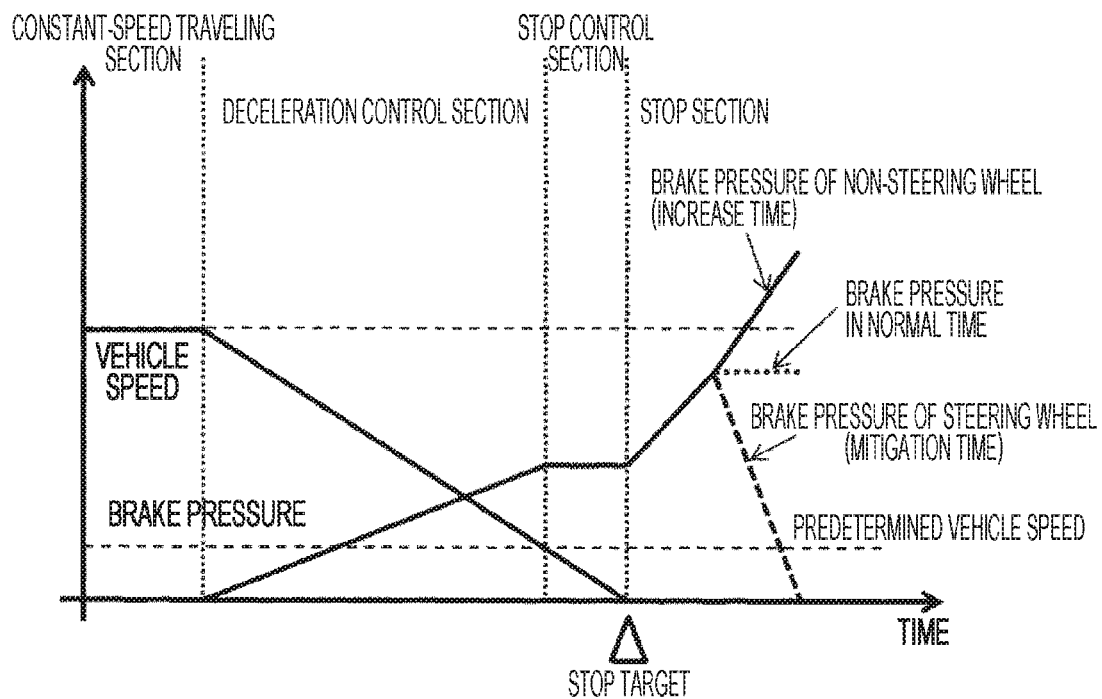
FIG. 5 is a time chart illustrating another example of change in vehicle speed and brake pressure in a case where the stop-time braking force mitigation control in the first embodiment of the present invention is executed.

FIG. 5 is a time chart illustrating another example of change in vehicle speed and brake pressure in a case where stop-time braking force mitigation control (step S105 in FIG. 3) is executed. In the example illustrated in FIG. 5, the stationary steering is detected in advance before stop or after stop of the vehicle, and the brake pressures of the steered wheels 51 and 52 are decreased to be lower than the brake pressures at the time of normal braking (illustrated by the dotted line in FIG. 5) after stop of the vehicle and at the same time the brake pressures of the non-steered wheels 53 and 54 are increased to be larger than the brake pressures at the time of normal braking. With the control, the steering load at the time of stationary steering is reduced, and the stop braking force of the entire vehicle can be maintained.

Figure 6:
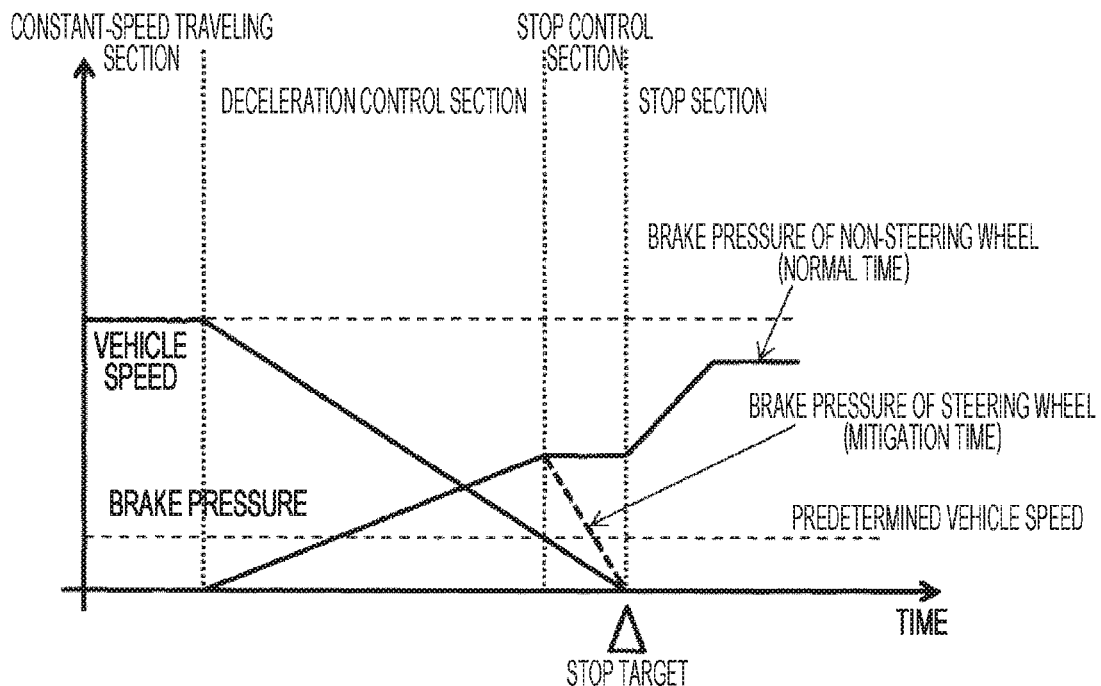
FIG. 6 is a time chart illustrating an example of change in vehicle speed and brake pressure in a case where pre-stop braking force mitigation control in the first embodiment of the present invention is executed.

FIG. 6 is a time chart illustrating an example of change in vehicle speed and brake pressure in a case where pre-stop braking force mitigation control (step S110 in FIG. 3) is executed. In the example illustrated in FIG. 6, the stationary steering is detected in advance at the point of time during braking of the vehicle and when the vehicle speed falls below the predetermined vehicle speed, and immediately after the detection, the brake pressures of the steered wheels 51 and 52 are decreased, and the steering load at the time of stationary steering is reduced. With the control, the brake pressures of the steered wheels 51 and 52 can be decreased to be zero before the vehicle is stopped, and the stationary steering can be performed in the state where the steering load is reduced, immediately after the stop of the vehicle.

Figure 7:
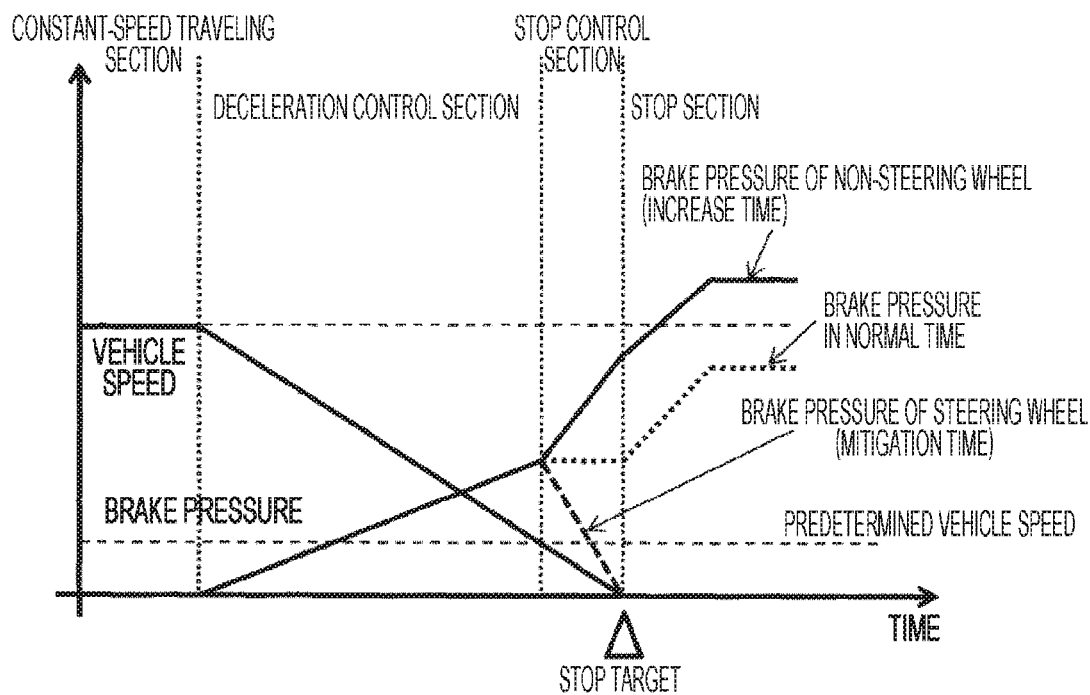
FIG. 7 is a time chart illustrating another example of change in vehicle speed and brake pressure in a case where pre-stop braking force mitigation control in the first embodiment of the present invention is executed.

FIG. 7 is a time chart illustrating another example of change in vehicle speed and brake pressure in a case where pre-stop braking force mitigation control (step S110 in FIG. 3) is executed. In the example illustrated in FIG. 7, the stationary steering is detected in advance at the point of time during braking of the vehicle and when the vehicle speed falls below the predetermined vehicle speed, and immediately after the detection, the brake pressures of the steered wheels 51 and 52 are decreased and at the same time the brake pressures of the non-steered wheels 53 and 54 are increased. With the control, the stationary steering can be performed in the state where the steering load is reduced, immediately after the stop of the vehicle, and deceleration braking force of the entire vehicle can be maintained. Here, the braking forces of the non-steered wheels 53 and 54 are increased such that a deceleration speed of the vehicle coincides with a deceleration speed at the time of normal braking, whereby operation feeling at the time of braking can coincide with operation feeling at the time of normal braking.

Figure 8:
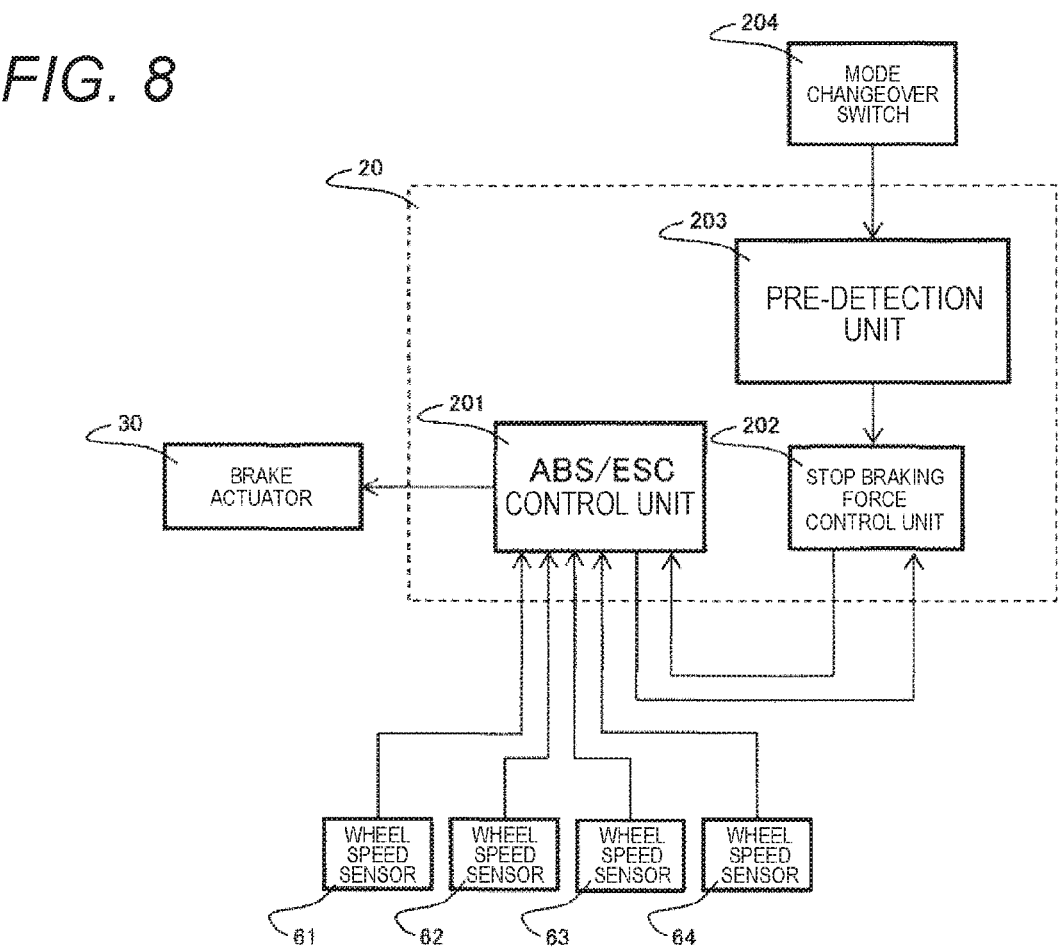
FIG. 8 is a control block diagram for describing an example of a prescribed precondition for detecting stationary steering in advance.

FIG. 8 is a control block diagram illustrating an example of a prescribed precondition for detecting stationary steering in advance. In the present control block diagram, a mode changeover switch 204 is included in addition to the configuration in FIG. 2. A mode changeover signal output from the mode changeover switch 204 is, for example, a signal for the occupant displaying his/her intention as to whether desiring the braking force mitigation control for reducing the steering load at the time of stationary steering, and is a binary signal indicating a mode of desiring the braking force mitigation control or a mode of not desiring the braking force mitigation control. When the mode of desiring the braking force mitigation control is selected, the pre-detection unit 203 determines that one of prescribed preconditions for detecting the stationary steering in advance is satisfied. This mode of desiring the braking force mitigation control is explained to users in advance as a mode of reducing the steering load at the time of stationary steering, thereby to offer convenience to the users. Further, the mode changeover signal is, for example, a signal for the occupant displaying his/her intention as to whether prohibiting the braking force mitigation control for reducing the steering load at the time of stationary steering, and is a binary signal indicating a mode of prohibiting the braking force mitigation control or a mode of not prohibiting the braking force mitigation control. When the mode of prohibiting the braking force mitigation control is selected, the pre-detection unit 203 determines that one of prescribed prohibition conditions for prohibiting the braking force mitigation control is satisfied.

FIGS. 9 to 12 are diagrams illustrating examples of the prescribed precondition for detecting stationary steering in advance.

Figure 9:
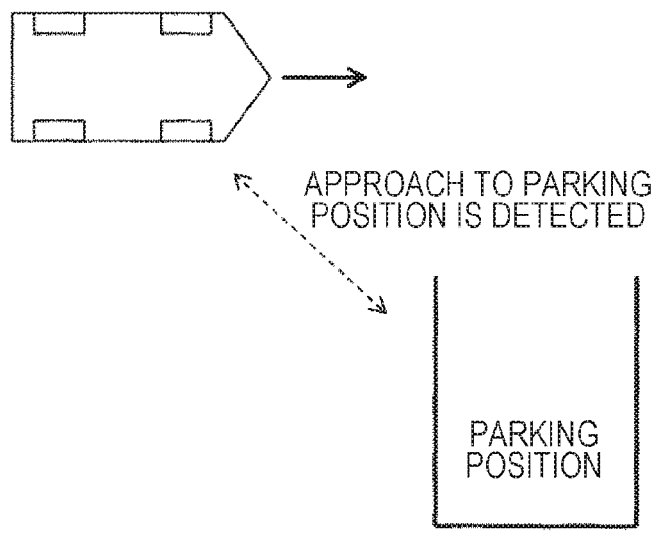
FIG. 9 is a diagram illustrating an example of a prescribed precondition for detecting stationary steering in advance.

In the example illustrated in FIG. 9, when detecting that the position of the vehicle has approached a parking position, the pre-detection unit 203 determines that one of the preconditions for detecting the stationary steering in advance is satisfied. Whether the position of the vehicle has approached the parking position may be detected on the basis of whether a distance between the position of the vehicle and the parking position falls below a predetermined distance, using a GPS or some communication means, for example, or may be detected on the basis of whether the position of the vehicle has entered a predetermined area (for example, a parking area) including the parking position.

Figure 10:
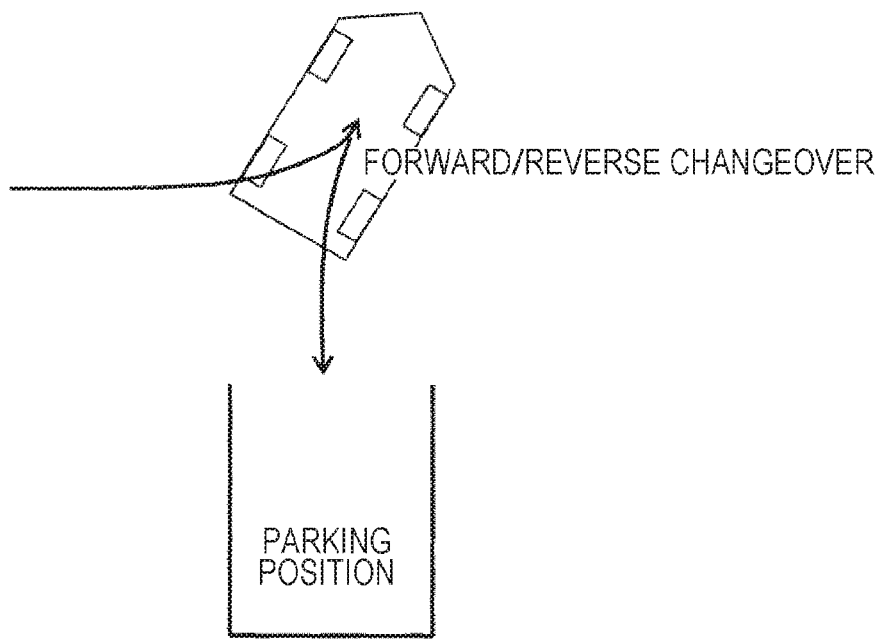
FIG. 10 is a diagram illustrating an example of a prescribed precondition for detecting stationary steering in advance.

In the example illustrated in FIG. 10, when changeover of forward movement and reverse movement is performed by shifting gears in the operation of the vehicle, the pre-detection unit 203 determines that one of the preconditions for detecting the stationary steering in advance is satisfied. This is because, in forward/reverse changeover, direction change is often intended, and there is a high possibility that the stationary steering is performed immediately after the forward/reverse changeover.

Figure 11:
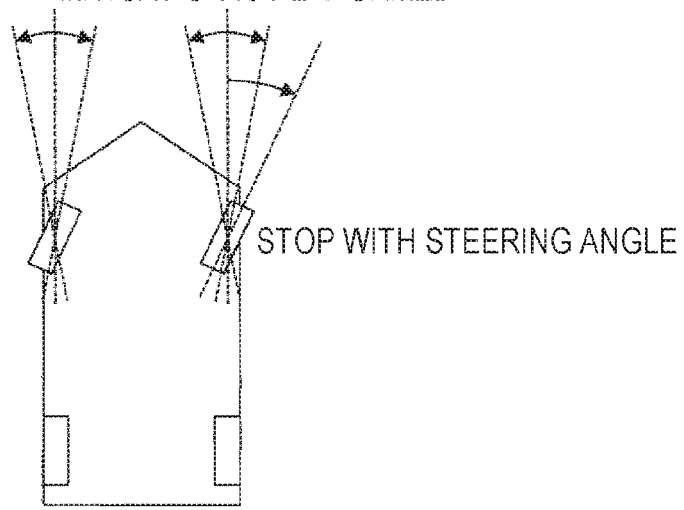
FIG. 11 is a diagram illustrating an example of a prescribed precondition for detecting stationary steering in advance.

In the example illustrated in FIG. 11, when steering angles of the steered wheels 51 and 52 at the point of time when the vehicle is stopped do not fall within a predetermined angle range including a neutral angle, the pre-detection unit 203 determines that one of the preconditions for detecting the stationary steering in advance is satisfied. This is because there is a high possibility that the stationary steering is performed just before the next forward movement or reverse movement in a case where the vehicle is stopped with a steering angle, and there is a high possibility that the stationary steering is performed to return the steering angle to the neutral angle in a case where the vehicle is stopped at the parking position.

Figure 12:
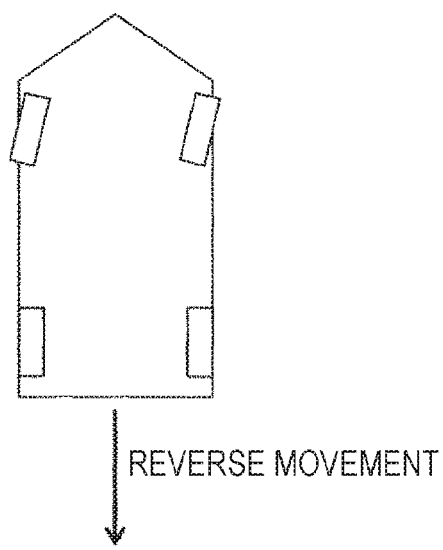
FIG. 12 is a diagram illustrating an example of a prescribed precondition for detecting stationary steering in advance.

In the example illustrated in FIG. 12, when the vehicle is performing reverse movement, the pre-detection unit 203 determines that one of the preconditions for detecting the stationary steering in advance is satisfied. This is because there is a high possibility that the stationary steering is performed in stop after reverse movement.

FIGS. 13 to 17 are diagrams illustrating examples of the prescribed prohibition condition for prohibiting the braking force mitigation control.

Figure 13:
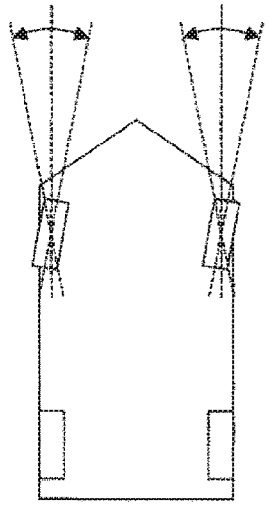
FIG. 13 is a diagram illustrating an example of a prescribed prohibition condition for prohibiting the braking force mitigation control.

In the example illustrated in FIG. 13, when the steering angles of the steered wheels 51 and 52 at the point of time when the vehicle is stopped fall within a predetermined angle range including a neutral angle, the stop braking force control unit 202 determines that one of the prescribed prohibition conditions for prohibiting the braking force mitigation control is satisfied. This is because there is a high possibility that, in a case where the steering angles of the steered wheels 51 and 52 when the vehicle is stopped are close to the neutral angle, this stop is stop at the parking position (or a high possibility that this stop is at least not stop for direction change).

Figure 14:
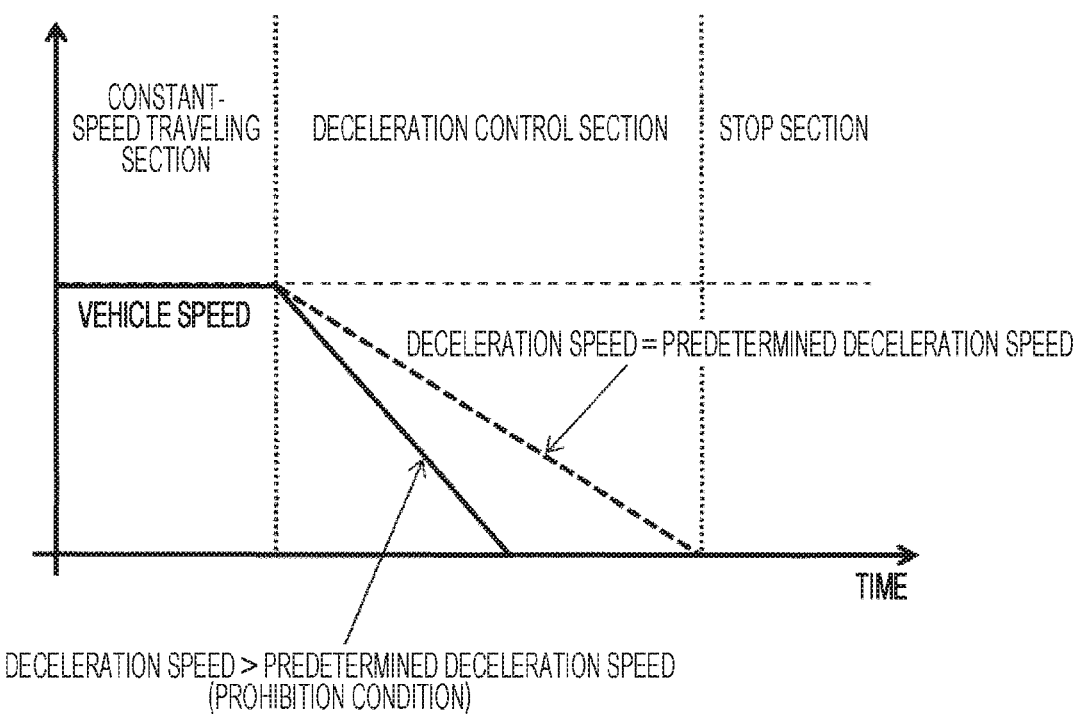
FIG. 14 is a diagram illustrating an example of a prescribed prohibition condition for prohibiting the braking force mitigation control.

In the example illustrated in FIG. 14, when the vehicle is during deceleration and the deceleration speed of the vehicle exceeds a predetermined deceleration speed, the stop braking force control unit 202 determines that one of the pre-scribed prohibition conditions for prohibiting the braking force mitigation control is satisfied. This is to prevent insufficiency of the braking forces or instability of braking by mitigating the braking forces of the steered wheels in strong braking.

Figure 15:
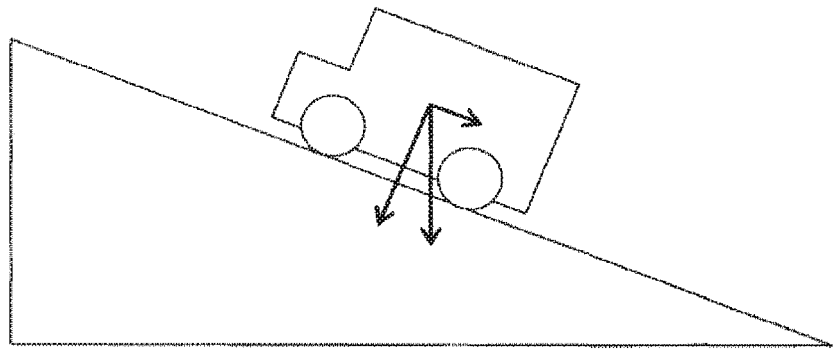
FIG. 15 is a diagram illustrating an example of a prescribed prohibition condition for prohibiting the braking force mitigation control.

In the example illustrated in FIG. 15, when the vehicle is located on a gradient road, the stop braking force control unit 202 determines that one of the prescribed prohibition conditions for prohibiting the braking force mitigation control is satisfied. This is to prevent insufficiency of the braking forces for decelerating the vehicle and the braking forces for maintaining the stopped state of the vehicle by mitigating the braking forces of the steered wheels 51 and 52. Whether the vehicle is located on the gradient road is determined using an acceleration sensor or map information, or on the basis of change in traveling resistance.

Figure 16:
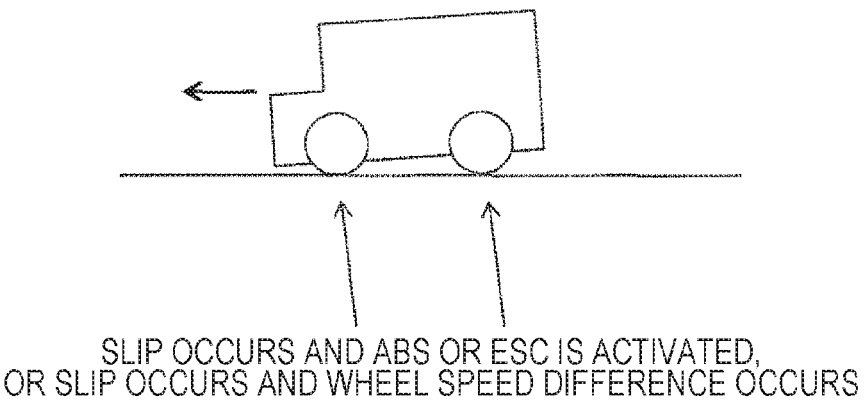
FIG. 16 is a diagram illustrating an example of a prescribed prohibition condition for prohibiting the braking force mitigation control.

In the example illustrated in FIG. 16, when the vehicle has slipped, the stop braking force control unit 202 determines that one of the prescribed prohibition conditions for prohibiting the braking force mitigation control is satisfied.

This is to prevent insufficiency of the braking forces for avoiding the slip by mitigating the braking forces of the steered wheels 51 and 52. Note that whether the vehicle has slipped is determined on the basis of whether an anti-lock braking system (ABS) or an electronic stability control (ESC) has been activated, or wheel speed differences among the wheels 51 to 54.

Figure 17:
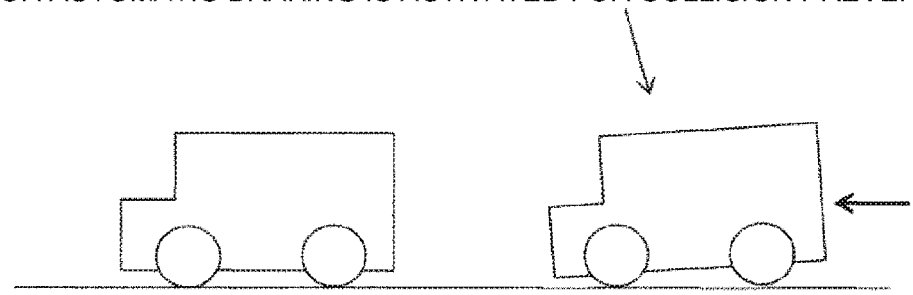
FIG. 17 is a diagram illustrating an example of a prescribed prohibition condition for prohibiting the braking force mitigation control.

In the example illustrated in FIG. 17, in a situation where the braking forces of the steered wheels 51 and 52 are larger than a prescribed braking force, or a situation where the braking forces of the steered wheels 51 and 52 are controlled for the purpose of collision prevention by the autopilot system mounted on the vehicle, not by the operation of the occupant, the stop braking force control unit 202 determines that one of the prescribed prohibition conditions for prohibiting the braking force mitigation control is satisfied. This is to prevent insufficiency of the braking forces for avoiding the collision prevention by mitigating the braking forces of the steered wheels 51 and 52.

In the present embodiment configured as described above, the steering (stationary steering) in the stopped state of the vehicle is detected in advance, and the braking force mitigation control to decrease the braking forces of the steered wheels 51 and 52 to be lower than the braking forces at the time of normal braking is executed before the stationary steering is started, whereby the steering load at the time of stationary steering is reduced and the burden of the steering device is reduced, and the stress accumulation due to the stationary steering is suppressed, and thus the burdens of the tire, the suspension device and the steering device can be reduced. In addition, the abnormal noise and swing of the vehicle can be prevented in mitigating the braking forces of the steered wheels 51 and 52 by suppressing the stress accumulation in the tire, the suspension device, and the steering device.

Second Embodiment

In the present embodiment, a case in which an autopilot system, not an occupant, operates (including steers) a vehicle, and a case in which the occupant and the autopilot system share the operation of the vehicle are assumed. The autopilot system is a system that performs an automatic operation for the purpose of automatic parking, for example, and is a system that performs an automatic operation for the purpose of U turn. Such an autopilot system plans some traveling path before the start of an operation for the intended operation. A place having a possibility of stationary steering in the planned traveling path is planned in advance.

Therefore, a braking force control device according to the present embodiment executes braking force mitigation control in a case of detecting the stationary steering in advance on the basis of an operation plan, and determining that there is no problem if decreasing braking forces of steered wheels 51 and 52.

Figure 18:
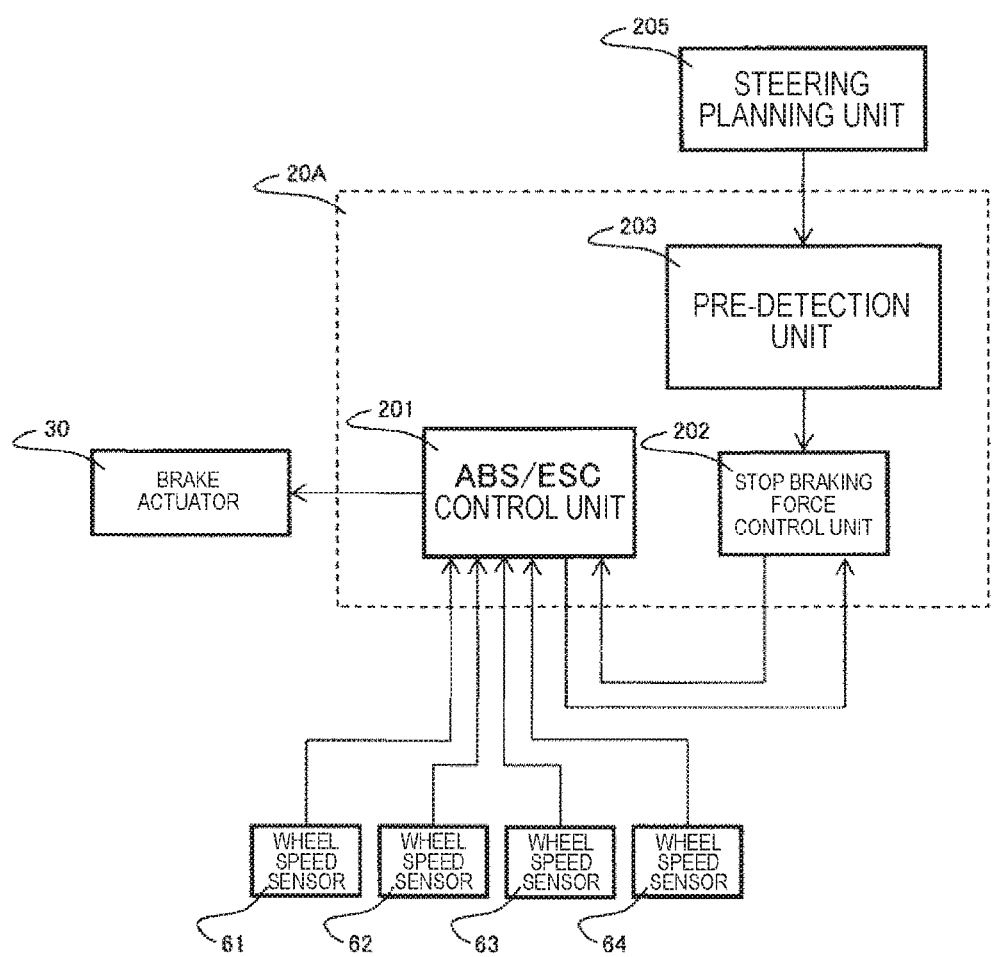
FIG. 18 is a control block diagram illustrating a braking force control device according to a second embodiment of the present invention.

FIG. 18 is a control block diagram illustrating a braking force control device 20A according to the present embodiment. In FIG. 18, a different point from the control block diagram (illustrated in FIG. 2) in the first embodiment is that information from a steering planning unit 205 is input to a pre-detection unit 203. The steering planning unit 205 creates the operation plan according to input operations from various sensor devices and the occupant, and inputs stationary steering information to the pre-detection unit 203 before execution of the stationary steering on the basis of the operation plan. When the stationary steering information is input, the pre-detection unit 203 determines that the stationary steering in a current stopped state or in a next stopped state is scheduled. The steering planning unit 205, the pre-detection unit 203, and a stop braking force control unit 202 may be mounted in a controller device for the autopilot system, may be mounted in the braking force control device 20A, or may be mounted in a controller device other than the aforementioned devices.

Figure 19:
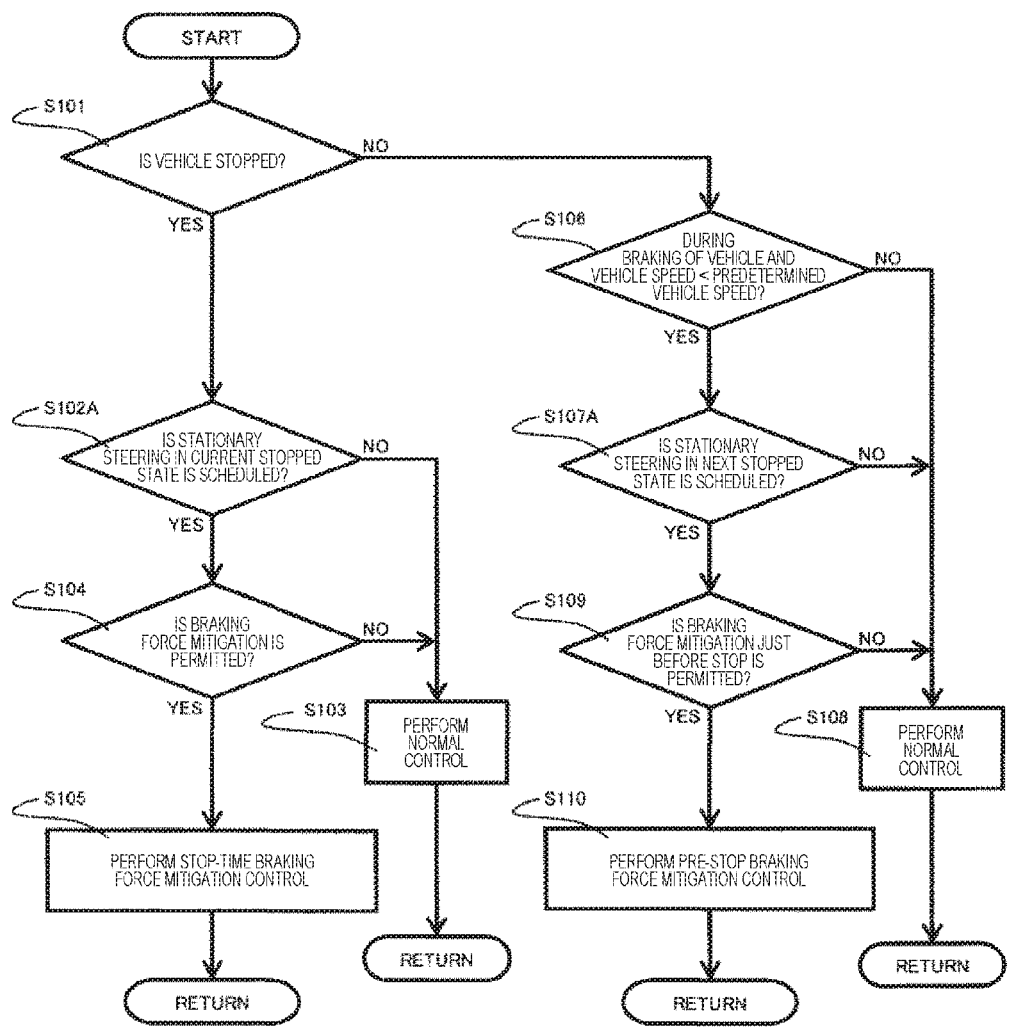
FIG. 19 is a flowchart illustrating braking force mitigation control in the second embodiment of the present invention.

FIG. 19 is a flowchart illustrating braking force mitigation control in the present embodiment. Control illustrated in the present flowchart is executed on a steady basis by the stop braking force control unit 202, similarly to the control in the first embodiment (illustrated in FIG. 3). Hereinafter, different points from the first embodiment will be mainly described.

In FIG. 19, the braking force mitigation control in the present embodiment has steps S102A and S107A in place of steps S102 and S107 in the first embodiment.

In a case where it is determined that the vehicle is stopped in step S101, whether the pre-detection unit 203 has detected the stationary steering in the current stopped state in advance is determined (step S102A). Here, the pre-detection unit 203 detects the stationary steering in the current stopped state in advance when the stationary steering in the current stopped state is scheduled in the operation plan.

In a case where it is determined that the stationary steering in the current stopped state is not scheduled (NO) in step S102A, normal control is executed (step S103) and the processing returns to step S101. On the other hand, in a case where it is determined that the stationary steering in the current stopped state is scheduled (YES) in step S102A, whether braking force mitigation of the steered wheels 51 and 52 is permitted is determined (step S104).

In a case where it is determined that it is during braking of the vehicle and a vehicle speed falls below a predetermined vehicle speed (YES) in step S106, whether the stationary steering in the next stopped state is scheduled in the operation plan is determined (step S107A).

In a case where it is determined that the stationary steering in the next stopped state is not scheduled (NO) in step S107A, the normal control is executed (step S108) and the processing returns to step S101. On the other hand, in a case where it is determined that the stationary steering in the next stopped state is scheduled (YES) in step S107A, whether the braking force mitigation of the steered wheels 51 and 52 just before stop is permitted is determined (step S109).

In the present embodiment configured as described above, similar effects to the first embodiment can be obtained. Further, the stationary steering is detected in advance on the basis of the operation plan, whereby execution of unnecessary braking force mitigation control in a case where no stationary steering is performed can be prevented.

The embodiments of the present invention have been described in detail. However, the present invention is not limited to the above-described embodiments and includes various modifications. For example, the embodiments have been described in detail for easy understanding of the present invention, and the present invention is not necessarily limited to one having all the described configurations. Further, a part of the configuration of a certain embodiment can be added to the configuration of another embodiment, or a part of the configuration of a certain embodiment can be deleted or can be replaced with a part of another embodiment.

REFERENCE SIGNS LIST 10 master cylinder
20, 20A ABS/ESC ECU (braking force control device)
30 brake actuator
40 steering assist device
51, 52 steered wheel
53, 54 non-steered wheel
61 to 64 wheel speed sensor
201 ABS/ESC control unit
202 stop braking force control unit
203 pre-detection unit
204 mode changeover switch
205 steering planning unit

The invention claimed is:

1. A vehicle braking force control device comprising a controller configured to carry out the operations comprising:
   individually controlling braking forces of a steered wheel and a non-steered wheel at a time of deceleration of a vehicle; and
   detecting steering of the vehicle in a first state of the vehicle in advance;
   wherein the controller is configured to:
      execute braking force mitigation control to decrease the braking force of the steered wheel to be lower than the braking force at a time of normal braking when the steering in the first state of the vehicle is detected in advance by the controller
   wherein execution of the braking force mitigation control comprises:
      specifying a higher braking pressure, a first upper limit of the higher braking pressure, and a decrease pressure value associated with the steered wheel; and
      specifying a lower braking pressure lower in magnitude from the higher braking pressure, a second upper limit of the lower braking pressure, and an increase pressure value associated with the non-steered wheel;
   wherein the stop braking force control unit does not execute the braking force mitigation control in a case where the state of the vehicle satisfies at least one prescribed predetermined prohibition condition;
   wherein the at least one predetermined prohibition condition includes a case in which the vehicle has slipped; and
   wherein whether the vehicle has slipped is determined on the basis of a wheel speed difference between the steered wheel and the non-steered wheel.

2. The vehicle braking force control device according to claim 1, wherein during execution of the braking force mitigation control, the controller is further configured to increase the braking force of the non-steered wheel at a same time of decreasing the braking force of the steered wheel, wherein an increased braking force of the non-steered wheel during execution of the braking force mitigation control is larger than the braking force applied to the non-steered wheel at the time of normal braking when the braking force mitigation control is not executed.

3. The vehicle braking force control device according to claim 1, wherein the controller is configured to detect the steering in the state of the vehicle in advance, during braking of the vehicle and when a speed of the vehicle falls below a predetermined vehicle speed.

4. The vehicle braking force control device according to claim 3, wherein the controller is configured to increase the braking force of the non-steered wheel during execution of the braking force mitigation control such that a deceleration speed of the vehicle during execution of the braking force mitigation control is the same as a deceleration speed at the time of normal braking.

5. The vehicle braking force control device according to claim 1, wherein the controller is configured to detect the steering in the first state of the vehicle in advance based on the state of the vehicle satisfying a prescribed predetermined precondition.

6. The vehicle braking force control device according to claim 5, wherein the predetermined precondition includes a case in which a mode changeover switch in communication with the controller outputs a mode changeover signal, wherein the mode changeover signal indicates that an occupant desires execution of the braking force mitigation control.

7. The vehicle braking force control device according to claim 5, wherein the predetermined precondition includes a case in which the vehicle has entered a predetermined area including a parking position.

8. The vehicle braking force control device according to claim 5, wherein the predetermined precondition includes a case in which a forward/reverse changeover operation has been performed by an occupant.

9. The vehicle braking force control device according to claim 5, wherein the predetermined precondition includes a case in which a steering angle of the steered wheel at a point of time when the vehicle is stopped does not fall within a predetermined angle range including a neutral angle.

10. The vehicle braking force control device according to claim 5, wherein the predetermined precondition includes a case in which the vehicle is performing reverse movement.

11. The vehicle braking force control device according to claim 1, wherein the predetermined prohibition condition further includes a case in which a mode changeover switch in communication with the controller outputs a mode changeover signal, wherein the ode changeover signal indicates that an occupant does not desire execution of the braking force mitigation control.

12. The vehicle braking force control device according to claim 1, wherein the predetermined prohibition condition further includes a case in which a steering angle of the steered wheel at a point in time when the vehicle is stopped falls within a predetermined angle range.

13. The vehicle braking force control device according to claim 1, wherein the predetermined prohibition condition further includes a case in which a braking force of the vehicle is insufficient for stopping the vehicle due to the execution of the braking force mitigation control.

14. The vehicle braking force control device according to claim 1, wherein the predetermined prohibition condition further includes a case of during braking of the vehicle and in which a deceleration speed of the vehicle exceeds a predetermined deceleration speed.

15. The vehicle braking force control device according to claim 1, wherein the predetermined prohibition condition further includes a case in which the vehicle is located on a inclined road, the inclined road being detected based on a change in traveling resistance of the vehicle.

16. The vehicle braking force control device according to claim 1, wherein whether the vehicle has slipped is further determined on the basis of whether an anti-lock braking system or an electronic stability control has been activated.

17. The vehicle braking force control device according to claim 1, wherein the predetermined prohibition condition further includes a case in which the braking force of the steered wheel is larger than a predetermined braking force.

18. The vehicle braking force control device according to claim 1, wherein the predetermined prohibition condition further includes a case in which the braking force of the steered wheel is controlled for a purpose of collision prevention of the vehicle by an autopilot system mounted on the vehicle.

19. The vehicle braking force control device according to claim 1, wherein the controller is configured to detect the steering in the first state of the vehicle in advance based on an operation plan created in a steering planning unit.

* * * * *